United States Patent
Lee et al.

(10) Patent No.: US 8,813,229 B2
(45) Date of Patent: Aug. 19, 2014

(54) APPARATUS, SYSTEM, AND METHOD FOR PREVENTING INFECTION BY MALICIOUS CODE

(75) Inventors: Jae Han Lee, Seoul (KR); Jeong Hun Kim, Seoul (KR); Sung Hyun Kim, Seoul (KR)

(73) Assignee: Ahnlab, Inc., Gyeonggi-Do (KR)

( * ) Notice: Subject to any disclaimer, the term of this patent is extended or adjusted under 35 U.S.C. 154(b) by 12 days.

(21) Appl. No.: 13/574,346

(22) PCT Filed: Jan. 20, 2011

(86) PCT No.: PCT/KR2011/000411
§ 371 (c)(1),
(2), (4) Date: Jul. 20, 2012

(87) PCT Pub. No.: WO2011/090329
PCT Pub. Date: Jul. 28, 2011

(65) Prior Publication Data
US 2013/0014260 A1    Jan. 10, 2013

(30) Foreign Application Priority Data
Jan. 22, 2010  (KR) .................... 10-2010-0005795

(51) Int. Cl.
G08B 23/00  (2006.01)
(52) U.S. Cl.
USPC ............... 726/24; 726/23; 713/187; 713/188
(58) Field of Classification Search
None
See application file for complete search history.

(56) References Cited

U.S. PATENT DOCUMENTS

| | | | | |
|---|---|---|---|---|
| 6,021,510 | A  * | 2/2000  | Nachenberg | 714/38.14 |
| 7,315,899 | B2 * | 1/2008  | Dunning et al. | 709/232 |
| 7,490,352 | B2 * | 2/2009  | Kramer et al. | 726/22 |
| 7,631,251 | B2 * | 12/2009 | Bower | 714/807 |
| 7,664,754 | B2 * | 2/2010  | Shipp | 726/24 |
| 7,961,119 | B1 * | 6/2011  | Huang | 341/50 |
| 8,230,510 | B1 * | 7/2012  | Yang et al. | 726/24 |
| 8,302,193 | B1 * | 10/2012 | Gardner et al. | 726/24 |
| 2003/0023866 | A1 * | 1/2003  | Hinchliffe et al. | 713/200 |
| 2003/0159090 | A1 * | 8/2003  | Wray et al. | 714/38 |
| 2011/0078794 | A1 * | 3/2011  | Manni et al. | 726/23 |
| 2011/0167275 | A1 * | 7/2011  | Niemela | 713/188 |

FOREIGN PATENT DOCUMENTS

| KR | 1020020024225 A | 3/2002 |
|---|---|---|
| KR | 1020030048933 A | 6/2003 |
| KR | 1020030051994 A | 6/2003 |
| KR | 1020060032855 A | 4/2006 |
| KR | 1020070049514 A | 5/2007 |

* cited by examiner

Primary Examiner — Philip Chea
Assistant Examiner — Khoi Le
(74) Attorney, Agent, or Firm — Bacon & Thomas, PLLC

(57) ABSTRACT

The invention relates to an apparatus for preventing infection by malicious code, comprising: a database in which files installed in an agent system, DNA values for each part of the files, and index information for indicating whether each file is normal or malicious are stored; a calculation unit which calculates a DNA value for a part of a file for which an execution is requested in the agent system; and a file inspection unit which searches the database to extract, in a group, files having the DNA value calculated by the calculation unit, inspects whether an object file is normal or malicious on the basis of the index information on the files extracted in a group, and allows the execution of the object file or makes a request for the calculation of DNA values of other parts which selectively include one part of the object file.

14 Claims, 4 Drawing Sheets

APPARATUS, SYSTEM, AND METHOD FOR PREVENTING INFECTION BY MALICIOUS CODE

TECHNICAL FIELD

The present invention relates to malicious code prevention, and more particularly, to an apparatus, system, and method for preventing an agent system from being infected by malicious code using DNA values of parts in an executable file.

BACKGROUND OF THE INVENTION

In general, in order to prevent a dedicated agent system, e.g., a dedicated computer system, from being infected by malicious code, an antivirus product having an antivirus engine may be installed in the dedicated system. An existing antivirus engine installed in the computer system may periodically require engine pattern data updates, as well as self updates, in order to prevent infection by malicious code. The related prior art is disclosed in Korean Published Patent Application No. 2006-0032855 (published on Apr. 18, 2006).

Update of antivirus engines may have the risk of false-positive detection so that a file running on a computer system to perform dedicated functions is determined as one having malicious code, and update of the computer system has the risk of incompatibility of dedicated programs.

Most dedicated computer systems have low performance hardware because their system specifications can't be modified. However, when an antivirus engine is installed and driven in a dedicated computer system with low performance hardware, the antivirus engine is taking a lot of system resources, e.g., CPU, memory, and network traffic, and therefore may disturb the operation of programs installed in the dedicated computer system and the operation of application programs running on the dedicated computer system. For this reason, there is a need for a security program that may also be used even in the dedicated computer system having lower performance hardware than required by the antivirus engine, such as a point of sale (POS) terminal and a low-spec. computer for use in production facilities.

In particular, a system with a Secure Operating System (OS) installed thereon compares hash values of existing files which have been previously stored in the system and an overall hash value of an executable file, and then checks if these files match with each other, thereby checking whether or not the executable file is permitted to be executed before execution.

Such a system needs to check a hash value of each executable file to read or execute the executable file, which entails an increased load of the terminal in case of a large size file.

DISCLOSURE

Technical Problem

In view of the above, the present invention provides an apparatus and method for preventing infection by malicious code, which can minimize load by calculating a DNA value of individual part in an executable file to be executed and determining whether the executable file is malicious or normal by comparison between the calculated DNA value and DNA values of individual parts in the previously stored file.

Further, the present invention provides a system and method for preventing infection by malicious code, in which a first DNA value for an executable file in an agent system is provided to a server system to determine whether the executable file is normal or malicious using a database of the server system.

In accordance with the present invention, there is provided an apparatus for preventing infection by malicious code in an agent system, the apparatus comprising: a database that stores files which were existent in the agent system, DNA values of parts in each file, and index information indicating whether each file is normal or malicious; a calculation unit configured to calculate a DNA value of a part in an executable file requested for execution by the agent system; and a file inspection unit configured to search the database to extract a group of files having the same DNA value as the DNA value calculated by the calculation unit, inspect whether the executable file is normal or malicious based on the index information of the respective files in the group, and allowing execution of the executable file or making a request for the calculation of a DNA value of another part in the executable file, wherein the another part selectively includes the part in the executable file.

In accordance with a first aspect of the present invention, there is provided a system for preventing infection by malicious code, the system comprising: an agent system configured to calculate a DNA value of a part in an executable file requested for execution, transmit the calculated DNA values over a communication network, and making a request for the inspection of the executable file; a server database that has files existent in the agent system, DNA values of parts in each file, and index information indicating whether each file is normal or malicious; and a server system configured to search the server database based on the DNA value transmitted over the communication network to extract a group of files having the same DNA value as the DNA value provided from the agent system, and provide the index information and DNA values of the respective files in the group to the agent system, wherein the agent system determines the executable file as a normal file based on the index information provided from the server system, or calculate a DNA value of another part in the executable file to further inspect the executable file, wherein the another part selectively includes the part in the executable file.

In accordance with a third aspect of the present invention, there is provided a method for preventing infection by malicious code in an agent system, the method comprising: calculating a DNA value of a part in an executable file requested for execution by the agent system; searching a database that has files existent in the agent system, DNA values of parts in each file, and index information indicating whether each file is normal or malicious, based on the calculated DNA value to extract a group of files having the same DNA value as the calculated DNA value; if the executable file is determined as normal based on the index information of the files in the group, allowing execution of the executable file, and otherwise, calculating a DNA value of another part, wherein the another part selectively includes the part in the executable file; comparing the calculated DNA value of the another part with the DNA values of the files in the group extracted from the database when the executable file has been determined as abnormal, and determining whether the executable file is malicious or normal by checking the index information of files having the same DNA value as the calculated DNA value of the another part; and repeatedly performing, by a predetermined number of times, the steps of allowing execution of the executable file based on the determination result, or calculating DNA values of other parts in the executable file to determine whether the object file is malicious or normal.

In accordance with a fourth aspect of the present invention, there is provided a method for preventing infection by malicious code in an agent system in conjunction with a server system including a server database that has files existent in the agent system, DNA values of parts in each file, and index information indicating whether each file is normal or malicious are stored, the method comprising: calculating a DNA value of a part in an executable file requested for execution by the agent system; providing the calculated DNA value to the server system over a communication network to make a request for inspection of the executable file; searching the server database to extract a group of files having the calculated DNA value in the server system in response to the request, and receiving index information and DNA values of the files in the group from the server system; and if the executable file is determined as normal based on the index information of the files, allowing execution of the executable file, and otherwise, inspecting the executable file again by calculating a DNA value of another part in the executable file, wherein the another part selectively includes the part in the executable file.

Advantageous Effects

In accordance with the present invention, it is possible to prevent infection by malicious code with the use of a small amount of system resources in a system with low specifications by checking whether an executable file is malicious or normal based on only a DNA value of a part in the executable file.

Further, the present invention is capable of minimizing network traffic by requesting a server system to perform inspection only with a DNA value of a part in an executable file, receiving a response to the request, and preventing infection by malicious code.

BEST MODE FOR THE INVENTION

The objects and effects of the present invention and technical constitutions of accomplishing these will be clearly understood from the following embodiments taken in conjunction with the accompanying drawings. In the following description, well-known functions or constitutions will not be described in detail if they would obscure the invention in unnecessary detail. Further, the terminologies to be described below are defined in consideration of functions in the invention and may vary depending on a user's or operator's intention or practice.

Hereinafter, embodiments of the present invention will be described in detail with reference to the accompanying drawings.

Figure 1:
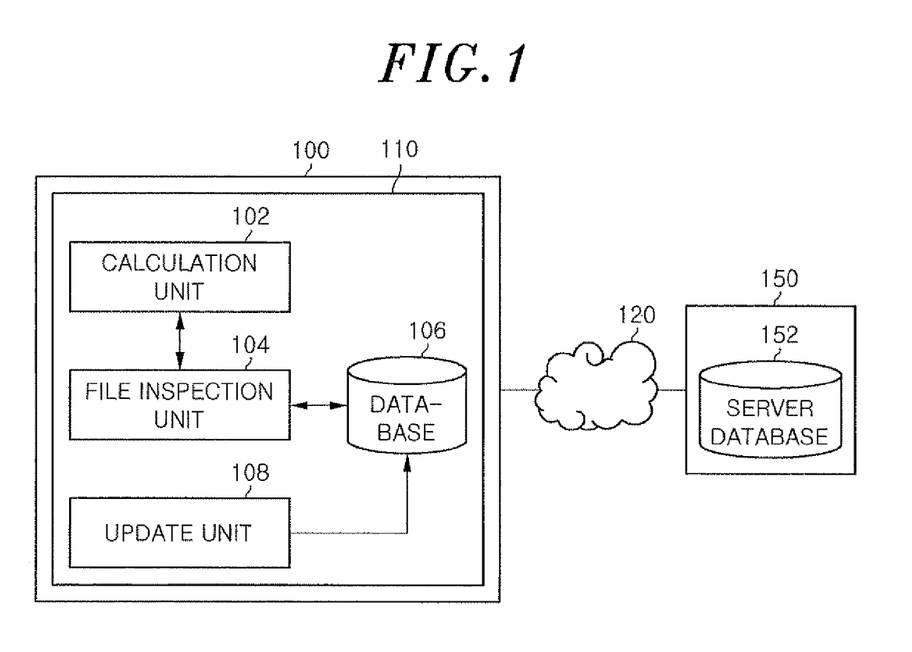
FIG. 1 is a block diagram of a system for preventing infection by malicious code in accordance with an embodiment of the present invention.

FIG. 1 is a block diagram illustrating the configuration of a system for preventing infection by malicious code in accordance with an embodiment of the present invention. The system for preventing infection by malicious code generally includes an agent system 100 having a malicious code infection prevention apparatus 110 and a server system 150 having a server database 152.

The agent system 100 may be a terminal with low system specifications, examples of which may include a terminal for managing automated equipments in a plant, a production management system, a POS system, or the like. The malicious code infection prevention apparatus 110 in the agent system 100 includes a database 106, a calculation unit 102, a file inspection unit 104, and an update unit 108.

The database 106 has files which were existent in the agent system 100, information values of parts in each file, i.e., DNA values, and index information indicating whether each file is normal or malicious.

When a file is to be executed in the agent system 100, the calculation unit 102 firstly identifies the format of the file instead of reading the entire of the file into a memory (not shown). If it is identified that the file is executable in the agent system, the calculation unit 102 calculates DNA values of parts where executable codes exist in the executable file depending on the execution order of the parts, and provides the calculated DNA values to the file inspection unit 104. In case where the executable file is a data file, the calculation unit 102 calculates DNA values of specific parts in the data file depending on the order of the specific parts to be loaded onto the memory and provides the calculated DNA values to the file inspection unit 104.

Figure 2:
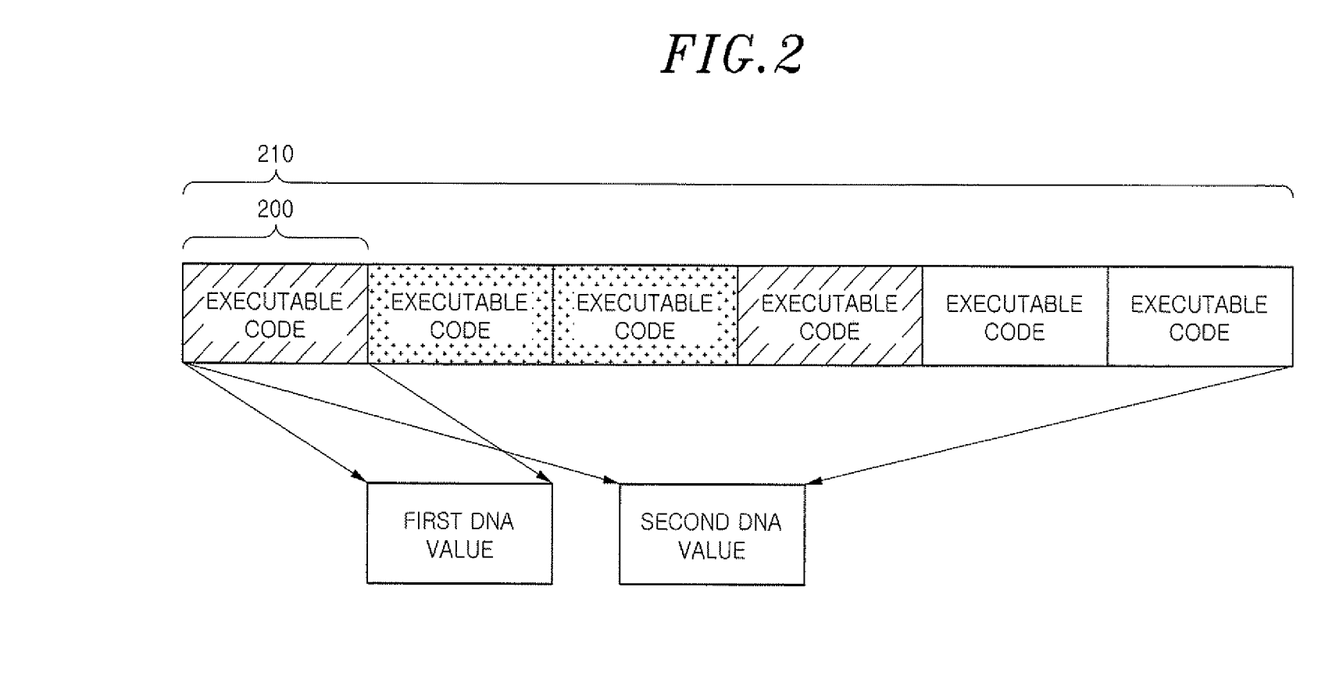
FIG. 2 is a diagram explaining a process of calculating DNA values in accordance with the embodiment of the present invention.

For example, in case where an executable file includes plural executable codes as shown in FIG. 2, the calculation unit 102 calculates a first DNA value of an executable code in a part 200, provides the calculated first DNA value to the file inspection unit 104, and calculates a second DNA value of an executable code in the part 210 under the control of the file inspection unit 104. As shown therein, the part from which the second DNA value is derived may have a larger range than the part from which the first DNA value is derived.

In the embodiment of the present invention, for example, a DNA value may be a value obtained by applying a CRC-based hash function to data in a part in an executable file.

The file inspection unit 104 compares the calculated DNA value provided from the calculation unit 102 with a DNA value previously stored in the database 106, and extracts a group of files having the same DNA value as the calculated DNA value from the database 106. The file inspection unit 104 checks index information of the extracted files in the group, and determines whether the executable file is normal or malicious. If the executable file is determined as a malicious file, the file inspection unit 104 makes a request for the calculation of DNA values of other parts in the executable file. Otherwise, if the executable file is detected as a normal file, the file inspection unit 104 allows the execution of the executable file.

However, if file(s) having the same DNA value as the calculated DNA value by the calculation unit 102 does not exist in the database 106, the file inspection unit 104 may prevent the execution of the executable file. Alternatively, if file(s) having the same DNA value as the calculated DNA value does not exist in the database 106, the file inspection unit 104 may access the server system 105 over a communication network 120 and make a request for file inspection using the calculated DNA value. Based on a result of the file inspection by the server system 150, the file inspection unit 104 may request the calculation unit 102 to calculate DNA values of other parts in the executable file, or allow or block file execution.

When there is a request to execute a new file, the update unit 108 allows the calculation unit 102 to calculate DNA values of parts in the new file, and updates the database 106 with the calculated DNA values. The update unit 108 may also update the database 106 with data provided from the server system 150, i.e., data containing DNA values of parts in executable files.

In the embodiment of the present invention, the new file may be a file that is put into the agent system 100 over an external communication network, for example, a file that is created by modifying an existing file based on a request from a manager or an external request, or a file that is created by the installation of a specific program or during a data generation process.

A file inspection method of the above-described malicious code infection prevention apparatus 110 in the agent system 100 will be described below with reference to FIG. 3.

Figure 3:
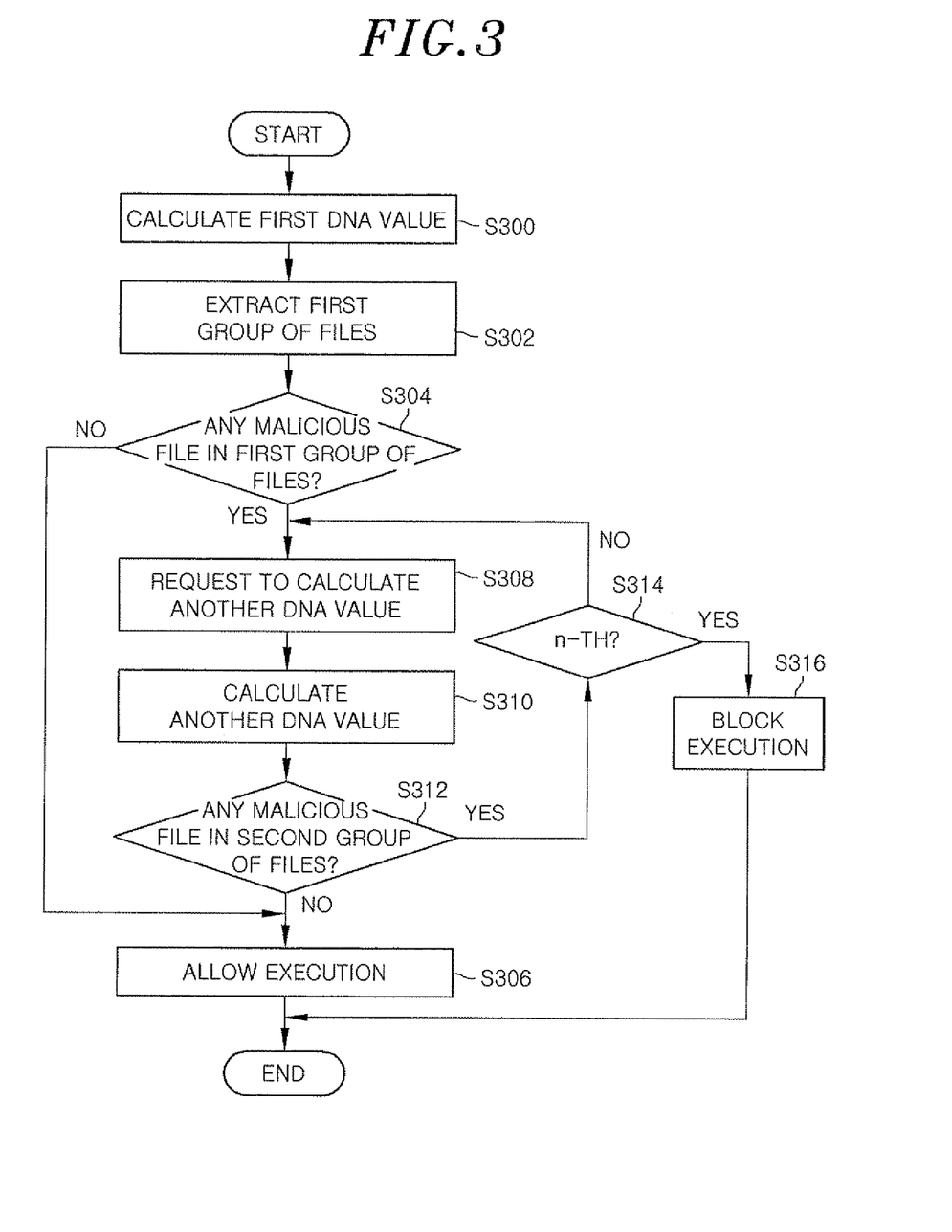
FIG. 3 is a flowchart illustrating a method for preventing infection by malicious code with the use of DNA values in accordance with the embodiment of the present invention.

FIG. 3 is a flowchart illustrating a method to inspect whether an executable file is malicious or normal by the malicious code infection prevention apparatus 110 in accordance with the embodiment of the present invention.

First, as shown in FIG. 3, the calculation unit 102 of the malicious code infection prevention apparatus 110 calculates a DNA value (a first DNA value) of a first part in an executable file requested for execution in step S300.

The file inspection unit 104 compares the calculated first DNA value with first DNA values of files stored in the database 106, and extracts a first group of files having the same DNA value as the calculated first DNA value from the database 106 in step S302. Based on the index information indicating whether each file in the first group is normal or malicious, the file inspection unit 104 determines whether malicious files exist in the first group in step S304.

As a result of determination in step S304, if none of the files in the first group is a malicious file, the file inspection unit 104 determines the executable file as a normal file without calculating an additional DNA value, and allows the executable file to be executed in step S306.

As a result of determination in step S304, however, if any one of the files in the first group is a malicious file, in step S308, the file inspection unit 104 further makes a request for the calculation of a DNA value (a second DNA value) of a second part different from the first part in the executable file. The calculation unit 102 then calculates the DNA value (a second DNA value) of the second part in the executable file in step S310, and provides it to the file inspection unit 104. In this regard, the second part in the executable file may be extended to include the first part from which the first DNA value is derived.

Hence, in step S312, the file inspection unit 104 compares second DNA values of the respective files in the first group extracted from the database 106 with the calculated second DNA value from the calculation unit 102 to extract a second group of files having the same DNA value as the calculated second DNA value, among the files in the first group. The file inspection unit then determines whether or not there exists a malicious file in the second group based on the index information of the respective files in the second group.

As a result of determination in step S312, if none of the files in the second group is a malicious file, the file inspection unit 104 determines the executable file as normal, and allows execution of the executable file. However, if any one of the files in the second group is a malicious file, the file inspection unit 104 checks if the calculated DNA value is an n-th DNA value in step S314. If the calculated DNA value is not an n-th DNA value, the method returns to the step S308 where the file inspection unit 104 makes a request for the calculation of the next-order DNA values of other parts in the executable file. The above steps S308, S310, and S312 are repeatedly performed until the n-th DNA value is calculated. If, in step S312, none of the files in an n-th group is a malicious file, the method advances to step S306 allowing execution of the executable file, otherwise if any one of files in an n-th group is a malicious file, the method goes to step S316 to block execution of the executable file. Here, "n" is an integer value, which may be variably set by the file inspection unit 104.

Alternatively, in the embodiment of the present invention, during the process of searching the database 106 to extract files of an n-th group, if there exists no file having the same n-th DNA value as the calculated n-th DNA value in the database 106, the calculated first to n-th DNA values for the executable file may be transmitted to the server system 150 over the communication network 120 to make a file inspection request for the concern file. Based on a response from the server system 150, if it is determined that the index information of the executable file indicates that the executable file is malicious, an (n+1)-th DNA value for the executable file is calculated. 1f, however, the index information of the executable file is determined as a value indicating that the executable file is normal, execution of the executable file is allowed. Here, if the executable file is determined as normal, the malicious code infection prevention apparatus 110 updates the database 106 with the DNA values of each order for the executable file.

On the other hand, if there exists no file having the DNA value of each order for the executable file even in the server system 150, the malicious code infection prevention apparatus 110 transmits the executable file to the server system 150. Accordingly, the server system 150 inspects whether or not the executable file is infected by malicious code using a preset antivirus engine, generates index information of the executable file in accordance with the inspection result, and updates the server database 152 and the database 106 of the malicious code infection prevention apparatus 110 based on the index information and the DNA values of each order for the executable file.

In accordance with the embodiment of the present invention, it is determined whether an executable file is normal or malicious by the calculation of DNA values of specific parts in the executable file without reading the entire of the executable file into the memory, thereby quickly identifying whether or not the executable file is executable.

The server system 150 updates the server database 152 with a DNA value of each part in an executable file provided from one or more agent systems 100, and broadcasts updated information of the server database 152 to the agent systems 100, thereby updating the databases 106 in the respective agent systems 100.

In addition, index information of each file stored in the server database 152 may be modified by the manager's setting or based on inspection using the anti-virus engine. The server system 150 broadcasts modified information to the agent systems 100 each time of a modification of the index information to thereby update the databases 106 of the respective agent systems 100.

A process for preventing infection by malicious code performed in the above-described agent system 100 in conjunction with the server system in accordance with the embodiment of the present invention will be described in detail with reference to FIGS. 4 and 5.

Figure 4:
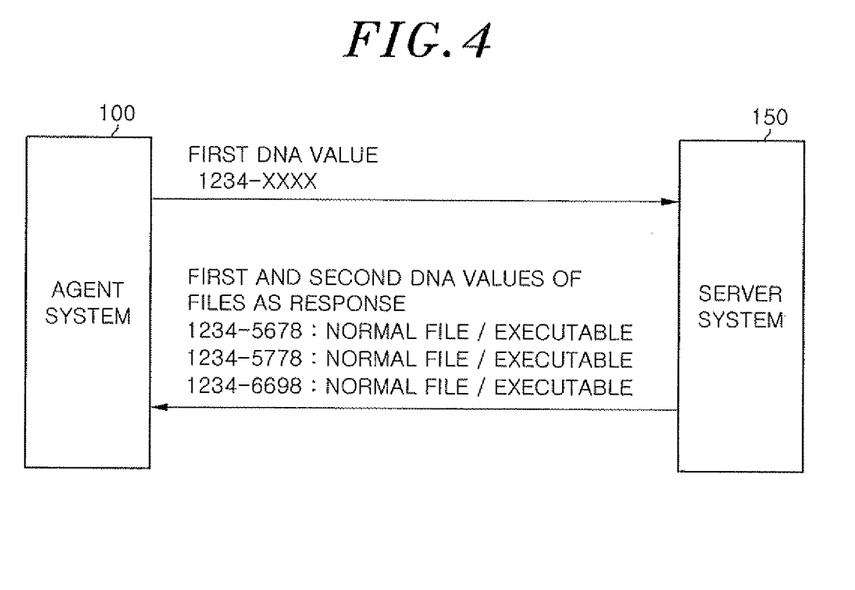
FIGS. 4 and 5 are exemplary views illustrating a process of preventing infection by malicious code performed by an apparatus in conjunction with a server system in accordance with the embodiment of the present invention.

As shown in FIG. 4, the agent system 100 calculates a first DNA value, e.g., 1234, of a specific part in an executable file requested for execution through the use of the calculation unit 102, and transmits the calculated first DNA value to the server system 150 to makes a request for file information.

In response thereto, the server system 150 searches the server database 152 to extract a group of files having the same DNA value as the first DNA value provided from the agent system 100, and transmits the group of files to the agent system 100. At this point, second to n-th DNA values of the respective files in the group and index information of the respective files are transmitted along with the group of files.

The file inspection unit 104 in the agent system 100 determines whether or not to allow execution of the executable file based on the group of files provided from the server system 150 and the index information of the group of files. In other words, if the index information of all the files in the group is indicated as normal, execution of the executable file is allowed, and otherwise, execution of the executable file is blocked.

Meanwhile, if no file having the same DNA value as the first DNA value provided from the agent system 100 is searched in the server database 152, the server system 150 requests the agent system 100 to transmit the executable file. The server system 150 receives the executable file, inspects the executable file using the antivirus engine, and transmits an inspection result to the agent system 100 to inform whether or not the executable file is executable. In the meantime, the server system 150 receives the first to n-th DNA values for the executable file from the agent system 100, and then updates the server database 152 with these DNA values.

Figure 5:
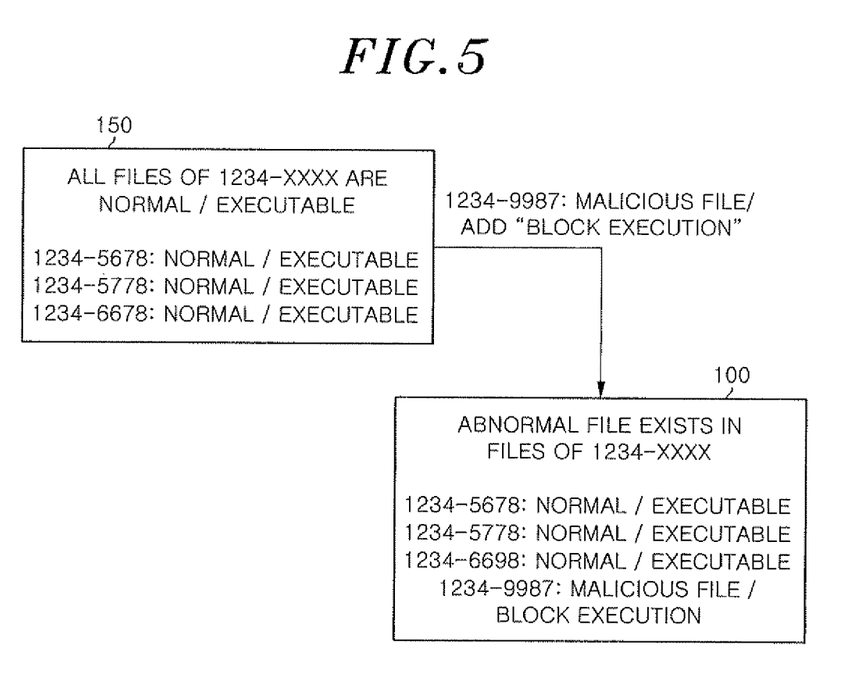

Referring to FIG. 5, the agents system 100 calculates the first DNA value, e.g., 1234, of the executable file through the use of the calculation unit 102, searches the database 106 to extract a group of files having the same DNA value as the first DNA value, e.g., 1234-5678, 1234-5778, 1234-6698, etc., and searches for the index information of all the files in the group. Even when the index information indicates that all the files are normal and executable, the file inspection unit 104 transmits the first DNA value of the executable file to the server system 150 to make a request for inspection, in order to diagnose the executable file more accurately. The server system 150 then searches the server database 152 to extract a group of files having the same DNA value as the first DNA value of 1234. An inspection of the index information of the respective files in the group is then performed. If index information of a file having a DNA value of 1234-9987 is indicated as malicious, the server system 150 transmits the DNA value 1234-9987 of the corresponding file, and a message instructing to recalculate index information and DNA value of the corresponding file to the agent system 100 in response to the request from the agent system.

Upon receipt of the message from the server system 150, the file inspection unit 104 in the agent system 100 controls the calculation unit 102 to calculate a second DNA value for the executable file. Next, the file inspection unit 104 inspects whether or not the calculated second DNA value is 9987 to determine whether the executable file is malicious or normal. The update unit 108 updates the database 106 with the DNA value of 1234-9987 and index information of the executable file.

Meanwhile, if the calculated second DNA value of the executable file is not 9987 and does not match the second DNA values of the respective files having the first DNA value of 1234, the first and second DNA values may be transmitted to the server system 150 to make a request for inspection, or the executable file may be transmitted to the server system 150 to make a request for inspection, as explained above.

While the invention has been shown and described with respect to the embodiments, the present invention is not limited thereto. It will be understood by those skilled in the art that various changes and modifications may be made without departing from the scope of the invention as defined in the following claims.

The invention claimed is:

1. An apparatus for protecting an agent system from malicious code, the apparatus comprising:
   a database configured to have files which were existent in the agent system, digital file fingerprint values of a plurality of parts in each of the files, and index information indicating whether said each of the files is normal or malicious;
   a calculation unit configured to calculate a digital file fingerprint value of a first part in an executable file accessed by the agent system based on an execution order of executable codes in the executable file;
   a file inspection unit configured to perform:
      searching the database to extract a group of files having the same digital file fingerprint values as the digital file fingerprint value calculated by the calculation unit,
      blocking execution of the executable file when the calculated digital file fingerprint value of the executable file does not match with the digital file fingerprint value of at least one file in the database,
      inspecting the executable file to determine whether the executable file is normal or malicious based on the index information of each file within the group of files,
      allowing execution of the executable file when the executable file is determined to be normal, otherwise, making a request for the calculation of a digital file fingerprint value of a second part in the executable file,
      wherein the second part comprises the first part and an additional part in the executable file so that a size of the second part is larger than a size of the first part.

2. The apparatus of claim 1, further comprising:
   an update unit configured to update the database with digital file fingerprint values of modified or newly created file and index information of the modified or newly created file indicating whether the modified or newly created file is normal or malicious, the digital file fingerprint values and the index information being received by the agent system via a communication network.

3. A system for protecting an agent system from malicious code, the system comprising:
   an agent system including a first processor, and a first memory for storing computer executable instructions that, when executed by the first processor, cause the first processor to implement, configured to perform:
      calculating a digital file fingerprint value of a first part in an executable file accessed by the agent system based on an execution order of executable codes in the executable file; and
      transmitting the calculated digital file fingerprint value via a communication network;
   a server-side database that has files which were existent in the agent system, digital file fingerprint values of a plurality of parts in each of the files, and index information indicating whether said each of the files is normal or malicious; and a server system including a second processor, and a second memory for storing computer executable instructions that, when executed by the second processor, cause the second processor to implement, configured to perform:

searching the server-side database based on the digital file fingerprint value transmitted via the communication network to extract a group of files having the same digital file fingerprint value as the digital file fingerprint transmitted via the communication network; and providing the agent system with the index information and digital file fingerprint values of each file within the group of files via the communication network;

wherein the agent system is configured to further perform:

determining whether the executable file is normal or malicious based on the index information provided via the communication network, or calculating a digital file fingerprint value of a second part in the executable file to further inspect the executable file, and wherein the second part comprises the first part and an additional part in the executable file so that a size of the second part is larger than a size of the first part.

4. The system of claim 3, wherein the agent system includes a client-side database which is configured to have digital file fingerprint values of a plurality of parts in each of files managed by the agent system, and index information indicating whether said each of the files is normal or malicious.

5. The system of claim 4, wherein, in case where no file that has the same digital file fingerprint value as at least one digital file fingerprint value calculated based on the executable file exists in the client-side database, the agent system transmits the calculated digital file fingerprint value to the server system via the communication network to make a request for the inspection of the executable file, and otherwise, the agent system is configured to compare the calculated digital file fingerprint value with a digital file fingerprint value stored in the client-side database to determine whether the executable file is normal or malicious.

6. The system of claim 4, wherein the agent system is configured to update the client-side database with the index information and the digital file fingerprint values of each file within the group of files transmitted from the server system.

7. The system of claim 3, wherein the agent system is configured to compare the digital file fingerprint value of the second part in the executable file with each of the digital file fingerprint values of each file within the group of files transmitted from the server system, and in case where no file that has the same digital file fingerprint value as at least one digital file fingerprint value calculated based on the executable file exists in the group, executable file is transmitted to the server system for file inspection.

8. The system of claim 7, wherein the server system is configured to further perform:

inspecting the transmitted executable file using a preset antivirus engine;

creating index information based on the inspection result; and calculating a digital file fingerprint value of each part in the executable file to update the server-side database.

9. A method for protecting an agent system from malicious code, the method comprising:

calculating a digital file fingerprint value of a first part in an executable file accessed by the agent system based on an execution order of executable codes in the executable file;

searching, based on the calculated digital file fingerprint value, a database that is configured to have files existent in the agent system, digital file fingerprint values of a plurality of parts in each of the files, and index information indicating whether said each of the files is normal or malicious are stored to extract a group of files having the same digital file fingerprint value as the calculated digital file fingerprint value;

allowing or blocking execution of the executable file when the executable file is determined as normal or malicious based on index information of each file within the group of files, and otherwise, calculating a digital file fingerprint value of a second part to further inspect the executable file, wherein the second part comprises the first part and an additional part in the executable file so that a size of the second part is larger than a size of the first part.

10. The method of claim 9, further comprising:

updating the database with digital file fingerprint values of modified or newly created file and index information of the modified or newly created file indicating whether the modified or newly created file is normal or malicious, the digital file fingerprint value and the index information being received by the agent system via a communication network.

11. A method for protecting an agent system from malicious code in conjunction with a server system and a server-side database that has files existent in the agent system, digital file fingerprint values of a plurality of parts in each of the files, and index information indicating whether said each of the files is normal or malicious, the method comprising:

calculating a digital file fingerprint value of a first part in a executable file by the agent system based on an execution order of executable codes in the executable file;

transmitting the calculated digital file fingerprint value via a communication network;

searching the server-side database to extract a group of files having the same digital file fingerprint value as the digital file fingerprint value transmitted via the communication network, and transmitting index information and digital file fingerprint values of the files in the group via the communication network;

when the executable file is determined as normal or malicious based on the index information transmitted via the communication network, allowing or blocking execution of the executable file, and otherwise, calculating a digital file fingerprint value of a second part in the executable file to further inspect the executable file, wherein the second part comprises the first part and an additional part in the executable file so that a size of the second part is larger than a size of the first part.

12. The method of claim 11, further comprising:

comparing the calculated digital file fingerprint value of the second part with each of the digital file fingerprint values for the files in the group extracted from the server-side database;

when it is determined that no file having the same digital file fingerprint value as the calculated digital file fingerprint value exists in the group, transmitting the executable file to the server system to make a request for file inspection;

inspecting the executable file transmitted from the agent system by using a preset antivirus engine in the server system;

creating index information of the executable file based on a result of said inspecting, and calculating a digital file fingerprint value of each part of the executable file to update the server database;

transmitting the index information from the server system to the agent system; and blocking or allowing execution of the executable file based on the index information in the agent system.

13. The method of claim 11, further comprising:

in case where no file having the same digital file fingerprint value as the calculated digital file fingerprint value exists as a result of said searching the server-side database, transmitting the executable file from the agent system to the server system;

inspecting the executable file transmitted from the agent system by using a preset antivirus engine in the server system;

creating index information of the executable file based on a result of said inspecting, and calculating a digital file fingerprint value of each part in the executable file to update the server database;

transmitting the index information from the server system to the agent system; and blocking or allowing execution of the executable file based on the index information in the agent system.

14. The method of claim 9, further comprising:

comparing the calculated digital file fingerprint value of the second part with each of the digital file fingerprint values of the files in the group extracted from the database, and determining whether the executable file is malicious or normal by checking the index information of files having the same digital file fingerprint value as the calculated digital file fingerprint value of the second part; and repeatedly performing, by a predetermined number of times, calculating digital file fingerprint value of a part comprising a previous part and an additional part in the executable file to determine whether the executable file is malicious or normal.

* * * * *